(12) United States Patent
Odaka

(10) Patent No.: US 6,900,996 B2
(45) Date of Patent: May 31, 2005

(54) METHOD AND APPARATUS FOR CONTROLLING A DC-DC CONVERTER

(75) Inventor: Akihiro Odaka, Tokyo (JP)

(73) Assignee: Fuji Electric Co., Ltd. (JP)

( * ) Notice: Subject to any disclaimer, the term of this patent is extended or adjusted under 35 U.S.C. 154(b) by 24 days.

(21) Appl. No.: 10/628,586

(22) Filed: Jul. 28, 2003

(65) Prior Publication Data

US 2004/0105280 A1 Jun. 3, 2004

(30) Foreign Application Priority Data

Jul. 26, 2002 (JP) ........................................ 2002-218285

(51) Int. Cl.[7] .............................................. H02H 7/122
(52) U.S. Cl. .................... 363/56.12; 363/21.1
(58) Field of Search ............................ 363/21.1, 21.11, 363/56.12, 21.04

(56) References Cited

U.S. PATENT DOCUMENTS 6,088,243 A * 7/2000 Shin ......................... 363/21.05
6,483,722 B2  11/2002 Nozawa et al. ............... 363/17

FOREIGN PATENT DOCUMENTS

JP           7-123706 A        5/1995

OTHER PUBLICATIONS

"The miniaturization of the AC adaptor by the SMZ system converter"; Ono Junichi et al.; 97 Switching–Regulator Handbook; Electronics Technology 1997–3; pp. 69–74.

* cited by examiner

Primary Examiner—Shawn Riley Jan
(74) Attorney, Agent, or Firm—Rossi, Kimms & McDowell

(57) ABSTRACT

Method and apparatus for controlling a DC-DC converter change the switching frequency of the switching devices and the on-off ratio of the switching devices. The on-off ratio can be changed in response to the output voltage and the switching frequency can be changed in response to the input voltage supplied by the DC power supply. Alternatively, the switching frequency can be changed while the on-off ratio is fixed at a certain value, and the on-off ratio can be changed while the switching frequency is fixed at a predetermined value after the switching frequency has reached the predetermined value, thereby preventing the switching frequency from exceeding the predetermined value.

6 Claims, 3 Drawing Sheets

METHOD AND APPARATUS FOR CONTROLLING A DC-DC CONVERTER

BACKGROUND OF THE INVENTION

The present invention relates to a method and apparatus for controlling a DC-DC converter having a half-bridge configuration.

FIG. 5 is a block circuit diagram of a conventional DC-DC converter. As shown in FIG. 5, the conventional DC-DC converter includes a first series circuit including metal-oxide-semiconductor field effect transistors (MOSFETs) 1, 2 connected in parallel to a DC power supply 10, a second series circuit including a capacitor 3 and a primary winding 6 of a transformer 9 and connected in parallel to the MOSFET 2, a snubber capacitor 4 connected in parallel to the MOSFET 2, and a rectifying and smoothing circuit 5 including a diode 11 connected to a secondary winding 7 of the transformer 9 and a diode 12 connected to another secondary winding 8 of the transformer 9. A first output voltage detector circuit 16 detects an output voltage $V_O$. A triangular wave generator circuit 14 generates a triangular wave signal, the frequency thereof changes corresponding to the difference between the output voltage $V_O$ and a reference output voltage. A comparator 15 compares the frequency of the triangular wave signal with the output from an on-off ratio setting circuit 13. A driver circuit 18 switches the MOSFETs 1, 2 on and off alternately at a fixed on-off ratio of 50%.

As described above, the conventional DC-DC converter shown in FIG. 5 controls the output voltage thereof by changing the switching frequency $F_S$ of the MOSFETs 1 and 2 at a fixed on-off ratio. Since the DC-DC converter described above is a general current-resonation-type one and since the operations thereof are also general, detailed descriptions on the conventional DC-DC converter will be omitted.

In the conventional DC-DC converter, the exciting inductance of the transformer should be low enough to prevent the switching frequency from increasing greatly. FIG. 6 is a set of curves relating the switching frequency $F_S$ for the DC power supply voltages Ed of 100 V and 400 V and the on-off ratio D with the output power $P_O$. In the conventional DC-DC converter, although the switching frequency changes to some extent depending on the load condition and the input voltage from the DC power supply, the on-off ratio D shows almost no change.

FIG. 7 is a wave chart describing the currents IQ1 and IQ2 flowing respectively through the MOSFETs 1, 2, and the currents ID11 and ID12 flowing respectively through the diodes 11 and 12 connected to the secondary side of the transformer under the rated load condition. FIG. 8 is a wave chart describing the currents IQ1 and IQ2 flowing respectively through the MOSFETs 1, 2, and the currents ID11 and ID12 flowing respectively through the diodes 11 and 12 connected to the secondary side of the transformer under the light load condition.

As a result of reducing the exciting inductance of the transformer to prevent the switching frequency from increasing greatly under the light load condition, high exciting currents flow into the transformer under the rated load condition as well as under the light load condition as the currents IQ1 and IQ2 in FIGS. 7 and 8 indicate. The exciting currents cause reactive currents, which further cause loses across the impedance in the circuit such as the on-resistance of the MOSFETs and the wiring resistance of the transformer. Due to the loses caused, the conversion efficiency of the DC-DC converter is low under the light load condition.

In view of the foregoing, it would be desirable to provide a method and apparatus for controlling a DC-DC converter, that facilitates preventing the switching frequency from increasing under a light load condition and improving the conversion efficiency of the DC-DC converter.

SUMMARY OF THE INVENTION

The invention provides a method and apparatus for controlling a DC-DC converter including a first series circuit including two switching devices connected between a positive terminal and a negative terminal of a DC power supply that supplies a DC input voltage, and a second series circuit including one or more capacitors and the primary winding of a transformer connected to one of the switching devices, the DC-DC converter switching on and off the switching devices to generate positive and negative voltages across the secondary winding of the transformer, and the DC-DC converter conducting half-wave rectification or full-wave rectification of the positive and negative voltages generated across the secondary winding of the transformer to obtain a DC output voltage, the method including: changing the switching frequency and an on-off ratio of the switching devices.

The on-off ratio is preferably changed corresponding to the output voltage and the switching frequency corresponding to the voltage of the DC power supply.

Alternatively, the switching frequency is mainly changed while the on-off ratio is fixed at a certain value, and the on-off ratio is changed while the switching frequency is fixed at a predetermined value after the switching frequency has reached the predetermined value to prevent the switching frequency from exceeding the predetermined value toward the higher side.

BRIEF DESCRIPTION OF THE DRAWINGS

The invention will be described with reference to certain preferred embodiments thereof and the accompanying drawings, wherein.

DETAILED DESCRIPTION OF THE PREFERRED EMBODIMENTS

Figure 1:
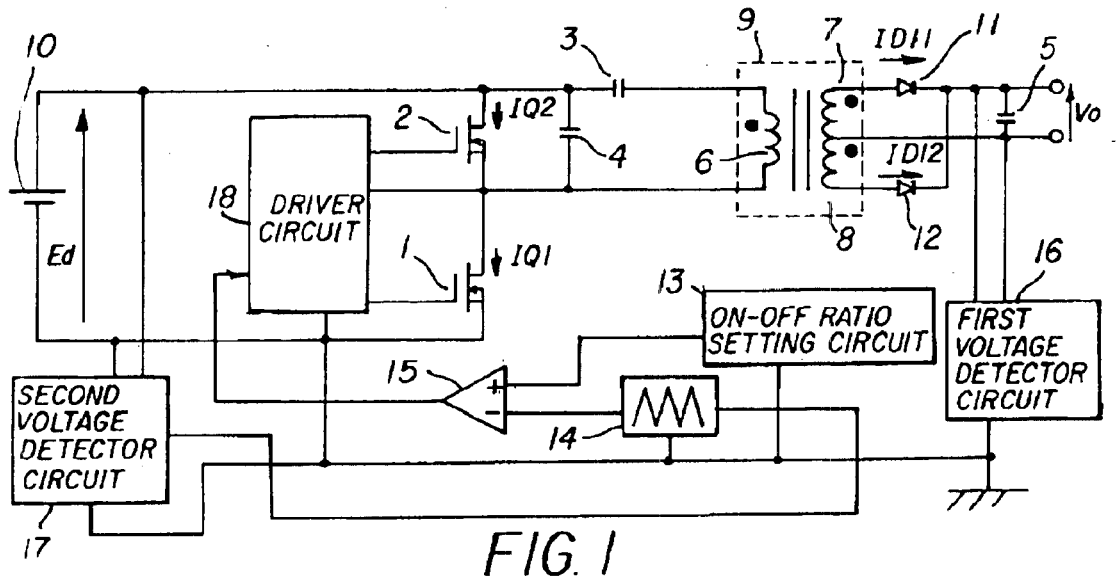
FIG. 1 is a block circuit diagram of a DC-DC converter controlled by the control method according to a first embodiment of the invention.

Now the invention will be described in detail hereinafter with reference to the accompanied drawing figures which illustrate the preferred embodiments of the invention. Throughout these figures, the same reference numerals and symbols as used in FIGS. 5 through 8 are used to designate the same constituent elements and their duplicated descriptions are omitted for the sake of simplicity.

FIG. 1 is a block circuit diagram of a DC-DC converter controlled by the control method according to a first embodiment of the invention. As shown in FIG. 1, the main circuit of the DC-DC converter according to the first embodiment is the same with that of the conventional DC-DC converter. The DC-DC converter according to the first embodiment of the invention is different from the conventional DC-DC converter in that the DC-DC converter according to the first embodiment further includes a second voltage detector circuit 17, the output of which is input to the triangular wave generator circuit 14, and in that the output of the first voltage detector circuit 16 is inputted also to the on-off ratio setting circuit 13.

Figure 2:
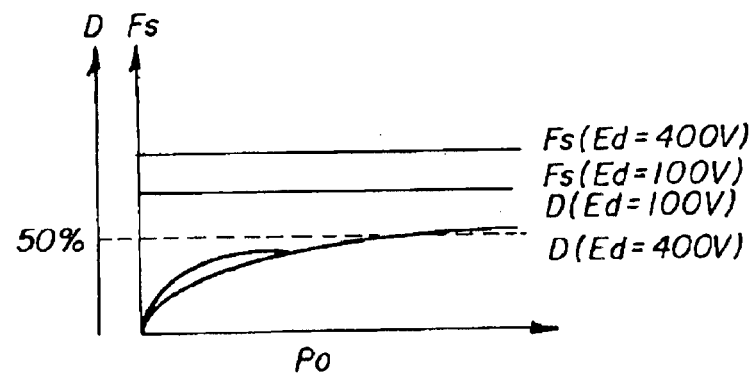
FIG. 2 is a set of curves relating the switching frequency $F_S$ and the on-off ratio D with the output power $P_O$ for the DC power supply voltages Ed of 100 V and 400 V.

FIG. 2 is a set of curves relating the switching frequency $F_S$ and the on-off ratio D with the output power $P_O$ (the product of the voltage $V_O$ and the currents ID11 and ID12) for the DC power supply voltages Ed of 100 V and 400 V.

In the circuit described above, the oscillation frequency of the triangular wave signal generated by the triangular wave generation circuit 14, which is the switching frequency $F_S$, is changed corresponding to the input voltage Ed fed from the DC power supply and detected by the second voltage detector circuit 17. The oscillation frequencies of the triangular wave signal for the input voltages Ed of 100 V and 400 V are made to be different from each other. At the same time, the on-off ratio D of the MOSFETs 1, 2 is adjusted (changed) as described in FIG. 2 corresponding to the output voltage $V_O$ detected by the first voltage detector circuit 16. Thus, the output voltage $V_O$ is controlled. The switching frequency $F_S$ for an arbitrary DC power supply voltage Ed is set in advance at any value, at which the on-off ratio D will be around 50% under the rated load condition, since the highest conversion efficiency is achieved at the on-off ratio of around 50% in the DC-DC converter, to which the present invention is applied.

Figure 3:
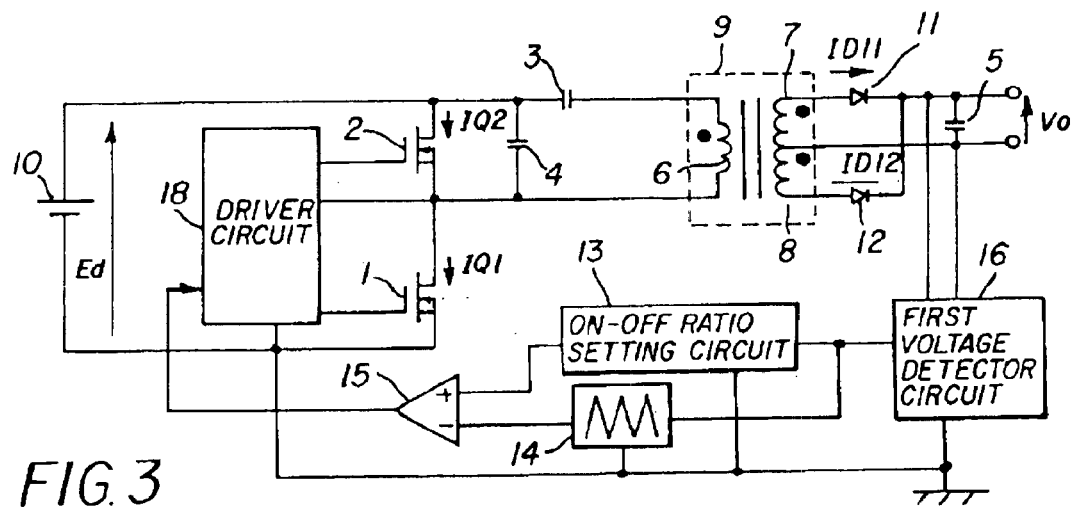
FIG. 3 is a block circuit diagram of a DC-DC converter controlled by the control method according to a second embodiment of the invention.

FIG. 3 is a block circuit diagram of a DC-DC converter controlled by the control method according to a second embodiment of the invention. As shown in FIG. 3, the main circuit of the DC-DC converter according to the second embodiment is the same with that of the conventional DC-DC converter. The DC-DC converter according to the second embodiment is different from the conventional DC-DC converter in that the output from the first voltage detector circuit 16 is inputted not only to the triangular wave generator circuit 14 but also to the on-off ratio setting circuit 13.

Figure 4:
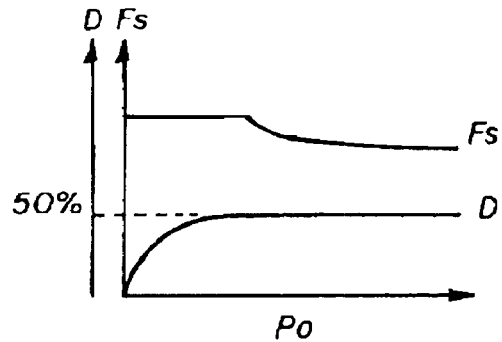
FIG. 4 is a pair of curves relating the switching frequency $F_S$ and the on-off ratio D with the output power $P_O$ for the DC power supply voltages Ed of 400 V.
Figure 5:
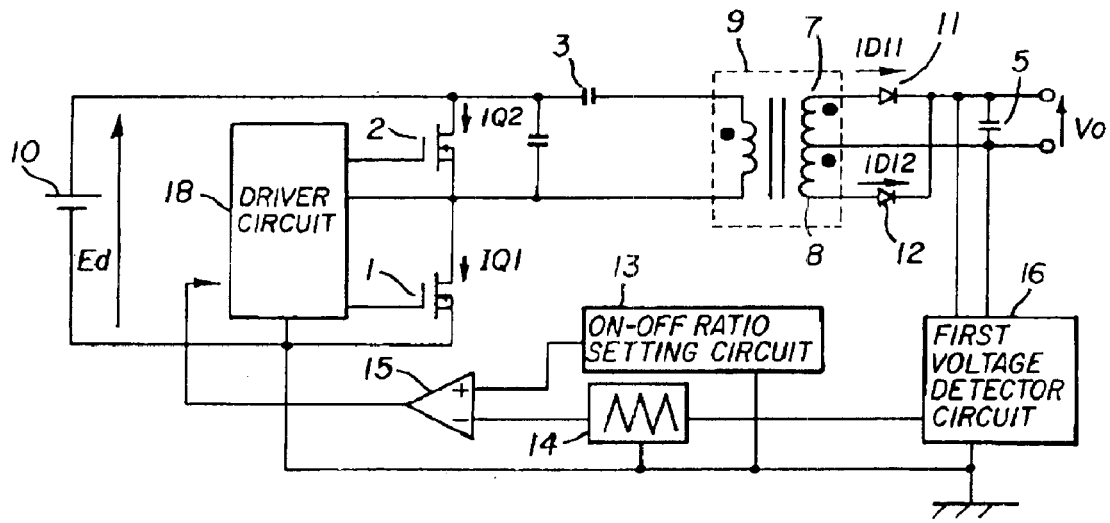
FIG. 5 is a block circuit diagram of a conventional DC-DC converter.
Figure 6:
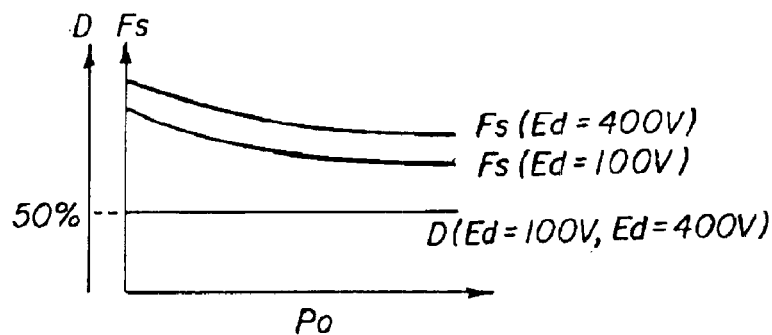
FIG. 6 is a set of curves relating the switching frequency $F_S$ for the DC power supply voltages Ed of 100 V and 400 V and the on-off ratio D with the output power $P_O$.
Figure 7:
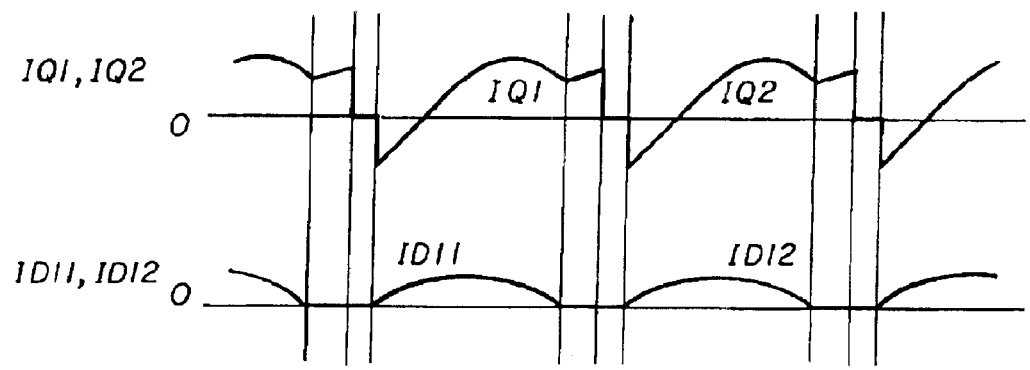
FIG. 7 is a wave chart describing the currents flowing through the MOSFETs in FIG. 5, and the currents flowing through the diodes connected to the secondary side of the transformer in FIG. 5 under the rated load condition.
Figure 8:
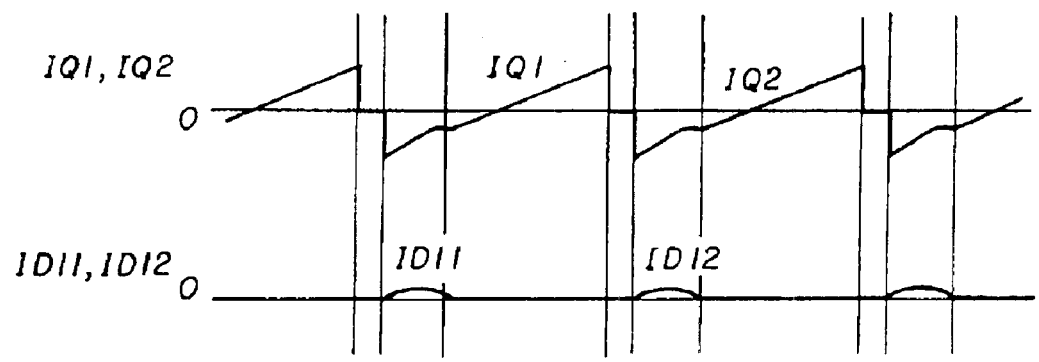
FIG. 8 is a wave chart describing the currents flowing through the MOSFETs in FIG. 5, and the currents flowing through the diodes connected to the secondary side of the transformer in FIG. 5 under the light load condition.

FIG. 4 is a pair of curves relating the switching frequency $F_S$ and the on-off ratio D with the output power $P_O$ for the DC power supply voltages Ed of 400 V.

The circuit configured as described in FIG. 3 adjusts the output voltage $V_O$ fundamentally by changing the switching frequency $F_S$ while fixing the on-off ratio D at 50%. When the switching frequency $F_S$ exceeds a certain limit under a light load condition and such conditions, the DC-DC converter in FIG. 3 controls the output voltage $V_O$ by changing the on-off ratio D while fixing the switching frequency $F_S$ at a certain value as described in FIG. 4.

Since the switching frequency is prevented from increasing greatly and the exciting current of the transformer is reduced according to the invention even when the exciting inductance of the transformer is higher than the conventional exciting inductance, loses caused by the reactive current is reduced. According to the invention, the conversion efficiency of the DC-DC converter is improved especially under a light load condition.

The invention has been described with reference to certain preferred embodiments thereof. It will be understood by those skilled in the art that modifications and variations are possible within the scope of the appended claims.

What is claimed:

1. A method of controlling a DC-DC converter including a first series circuit including two switching devices connected between a positive terminal and a negative terminal of a DC power supply that supplies a DC input voltage, and a second series circuit including one or more capacitors and a primary winding of a transformer connected to one of the switching devices, the DC-DC converter switching on and off the switching devices, whereby to generate positive and negative voltages across a secondary winding of the transformer, and the DC-DC converter conducting half-wave rectification or full-wave rectification of the positive and negative voltages generated across the secondary winding of the transformer, thereby to obtain a DC output voltage, comprising:

changing the switching frequency of the switching devices; and changing the on-off ratio of the switching devices.

2. The method according to claim 1, wherein the on-off ratio is changed in response to the output voltage and the switching frequency is changed in response to the input voltage supplied by the DC power supply.

3. The method according to claim 1, wherein the switching frequency is changed while the on-off ratio is fixed at a certain value, and wherein the on-off ratio is changed while the switching frequency is fixed at a predetermined value after the switching frequency has frequency has reached the predetermined value, thereby preventing the switching frequency from exceeding the predetermined value.

4. A DC-DC converter comprising:

a first series circuit including two switching devices connected between a positive terminal and a negative terminal of a DC power supply that supplies a DC input voltage;

a second series circuit including one or more capacitors and a primary winding of a transformer connected to one of the switching devices;

switching frequency changing means for changing a switching frequency of the to switching devices; and on-off ratio changing means for changing a on-off ratio of the switching devices;

wherein switching of the on and off the switching devices generates positive and negative voltages across a secondary winding of the transformer; and wherein the DC-DC converter conducts half-wave rectification or full-wave rectification of the positive and negative voltages generated across the secondary winding of the transformer thereby to generate a DC output voltage.

5. The DC-DC converter as claimed in claim 4, wherein the on-off ratio changing means changes the on-off ratio in response to the output voltage and the switching frequency changing means changes the switching frequency in response to the input voltage supplied by the DC power supply.

6. The DC-DC converter as claimed in claim 4, wherein switching frequency changing means changes the switching frequency while the on-off ratio is fixed at a certain value, and wherein on-off ratio changing means changes the on-off ratio while the switching frequency is fixed at a predetermined value after the switching frequency has reached the predetermined value, thereby preventing the switching frequency from exceeding the predetermined value.

* * * * *

UNITED STATES PATENT AND TRADEMARK OFFICE
CERTIFICATE OF CORRECTION

PATENT NO. : 6,900,996 B2
DATED : May 31, 2005
INVENTOR(S) : Akihiro Odaka

It is certified that error appears in the above-identified patent and that said Letters Patent is hereby corrected as shown below:

Title page,
Item [57], ABSTRACT,
Lines 1-3, should read -- Method and apparatus for controlling a DC-DC converter can change the switching frequency of the switching devices and the on-off ratio of the switching devices. --.

Signed and Sealed this

Twenty-seventh Day of December, 2005

JON W. DUDAS
*Director of the United States Patent and Trademark Office*